United States Patent Office 3,293,038
Patented Dec. 20, 1966

3,293,038
RUMINANT FEEDS CONTAINING ALKYLATED
PHENOLS
Gino J. Marco, Webster Groves, and Eugene S. Erwin, St. Louis, Mo., assignors to Monsanto Company, a corporation of Delaware
No Drawing. Filed June 7, 1963, Ser. No. 286,171
16 Claims. (Cl. 99—2)

This invention relates to novel animal feed compositions, and particularly compositions for optimum feeding of ruminants. More specifically, the invention involves the incorporation of additives which will affect the rumen microflora and promote a more efficient use of the nutrients in normal feeds.

In studying the effect of the various proposed additives for ruminant feeds, the development of data by feeding sheep or cattle is prohibitive both with respect to time and space requirements. Furthermore, the feed consumption of the animals is such that meaningful data could only be obtained by expending very large quantities of feed and unreasonable amounts of the proposed additives.

It has been known that the chemical compositions of the rumen fluids will reflect the well being of the ruminant and will provide a means of ascertaining the feed efficiency, the weight gain of the animal, and the adequacy of the feed. Rumen fluids contain a substantial proportion of volatile fatty acids, including acetic, propionic and butyric acids. These acids are derived from carbohydrate fermentation by rumen microflora and provide the principal source of energy to the animal. Of these fatty acids, the propionic acid content is most indicative of feed efficiency and weight gain. Increases in this component will be reflected immediately by improved feed utilization by the ruminant. These chemical changes in the rumen fluids can be measured by withdrawing samples of the fluid and determining the propionate content by chemical analysis. However, this procedure is also prohibitive because of the quantity of feed consumed and the size of the experimental adjuvant samples required.

It has been discovered that small scale in vitro experiments will enable the study of the effect of feed adjuvants without requiring a large number of animals or an unreasonable quantity of the feed components. It has also been found that these in vitro experimental data can be corroborated by in vivo experiments. Furthermore, the correlation of rumen fluid analysis and growth stimulation has been well established.

The in vitro experiments are fermentation reactions in which the conditions existing in the rumen are simulated. The test additive (534 mg.) is dissolved in 5 to 10 ml. of acetone or methylene chloride and mixed with 2 grams of a standard substrate (68% corn starch, 17% alpha-cellulose, and 15% soybean meal). The mixture is evaporated in a nitrogen atmosphere with constant stirring to provide a substrate coated with the test additive. This coated substrate (119 mg.) is mixed with 300 mg. of uncoated substrate and charged to 50 ml. Erlenmeyer flasks. Rumen fluid from a fasted sheep (22 to 23 hours) is taken, filtered through four layers of cheesecloth and 10 ml. of the fluid charged to each flask. A buffer solution of the following composition is prepared and adjusted to pH 6.8 with aqueous 4N HCl.

| | Buffer solution in grams per liter |
|---|---|
| $NaH_2PO_4$ | .316 |
| $KH_2PO_4$ | .152 |
| $NaHCO_3$ | 2.260 |
| $KCl$ | .375 |
| $NaCl$ | .375 |
| $MgSO_4$ | .112 |
| $CaCl_2$ | .038 |
| $FeSO_4 \cdot 7H_2O$ | .008 |
| $MnSO_4$ | .004 |
| $ZnSO_4 \cdot 7H_2O$ | .004 |
| $CuSO_4 \cdot 5H_2O$ | .002 |
| $CoCl_2$ | .001 |

The flasks are purged with nitrogen, stoppered with pressure release valves and heated at 39° C.±0.5° C. on a water shaker bath. The fermentation mixtures are then incubated for 16 hours and analyzed to determine the propionate change, as increase or decrease in weight percent.

Using the above described procedure, it has been found that certain alkylated phenols and alkali metal salts thereof are useful additives for increasing the concentration of propionate in the rumen. To be effective, the phenols preferably have the structure

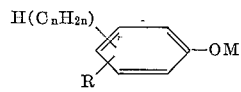

wherein R is an alkyl radical with from seven to twelve carbon atoms, wherein n is an integer from zero to four, and wherein M is selected from the group consisting of hydrogen and alkali metals, particularly sodium. By the introduction of these compounds in a ruminant feed the usefulness of the feed can be improved. It has been found that from 0.1 percent by weight to 2.0 percent will produce optimum results.

*Example 1*

A large number of alkyl phenols and salts thereof were tested for nutrient values by the above described technique. Analysis of the fermented rumen fluid mixtures showed the following differences from a control of identical composition except with the phenol omitted.

| Difference from control: | Propionate weight percent |
|---|---|
| p-Ethylphenol | −3.0 |
| o-Ethylphenol | −2.8 |
| n-Octylphenol (mainly ortho) | 12.4 |
| p-(N-amyl)phenol | −5.4 |
| Octylphenol (branched) | 11.6 |
| Nonyl phenol (branched) | 12.6 |
| o-(Nonyl)phenol | 9.8 |
| Dodecyl phenol (branched) | 1.0 |
| p-Nonyl-o-cresol | 8.5 |
| Nonyl-cyclohexanol | −5.7 |
| n-Decylphenol | 12.6 |

The data demonstrates that the alkyl substituent on the alkylated phenol should be greater than five carbons and should not exceed 12 carbons. The data also shows that compounds with cyclohexyl groups in place of phenyl do not have the same activity. If a second substituent is on the phenyl ring, it should be short, for example one to four carbons.

Example 2

To determine the relationship of concentration to increase of propionate content a series of in vitro experiments were conducted with each of the preferred alkylated phenols at concentrations which were related to the concentration in the rumen at threshold of activity. The .3 mg. per test flask is less than the practical level whereas the 1 mg. and 3 mg. experiments are well within the range of practical usage of 0.1 to 2 percent by weight in the feed.

| Phenol | (Mg. per flask) | Percent weight increase in propionate |
|---|---|---|
| n-Octylphenol | 3 | 18 |
|  | 1 | 17 |
|  | 0.3 | −2.7 |
| n-Decylphenol | 3 | 12.6 |
|  | 1 | 12.4 |
|  | 0.3 | −4.0 |
| o-(n-Nonyl)phenol | 3 | 13.1 |
|  | 1 | 15.6 |
|  | 0.3 | −1.0 |
| p-(n-Nonyl)phenol | 3 | 6.4 |
|  | 1 | 12.5 |
|  | 0.3 | 0.2 |
| Octyl phenol (branched) | 3 | 19.3 |
|  | 1 | 17.9 |
|  | 0.3 | −0.2 |
| Nonyl phenol (branched) | 3 | 12.7 |
|  | 1 | 15.8 |
|  | 0.3 | 0.5 |
| Nonyl phenol (mixture) | 3 | 9.1 |
|  | 1 | 18.4 |
|  | 0.3 | 4.2 |

Example 3

In vivo tests were made by feeding sheep a conventional grain-alfalfa diet with the alkylated phenols showing optimum effects in the in vitro tests. The following results were obtained by analysis of the rumen fluids.

Percent of control: Propionate
  Dodecyl phenol (0.5%) _____ 135
  Nonyl phenol
    (0.5%) _____ 158
    (1.0%) _____ 191

An essential component in ruminant feeds is the cellulosic roughage component. By the expression "cellulosic roughage," it is intended to refer to any nutrient component which contains at least 5% fiber. The fiber is principally cellulose which may also contain lignin chemically bound thereto. Typical fiber containing feeds include hay, straw, cottonseed hulls, cotton mill wastes, beet pulp, silage, ground corn cobs, corn stalks, oats, barley, cereal brans, and cereal middlings. One or more of these cellulosic roughage components is essential in balanced ruminant feeds and at least 0.5% by weight is included and as much as 60% or more may be used. However, in some areas cattle are fed with diets consisting essentially of barley and/or oats or substantially entirely of these high fiber cereals.

In the preparation of ruminant feeds at least one cellulosic roughage component is used and this component is preferably present in excess of 2% by weight although it may greatly exceed this preferred minimum content. These fiber containing components are conventional in ruminant feeds, and are desirable because of their high fiber content and because the ruminant animal has the ability to digest such cellulosic components.

The ruminant feeds may contain natural oils including animal fats, such as beef tallow, mutton tallow; fish oils including eel, herring, menhaden, tuna and salmon oil; and whale oil. The vegetable oils are usually of higher unsaturated acid content and are therefore generally liquid, for example soybean oil, sunflower oil, olive oil, safflower oil, corn oil, peanut oil, cottonseed oil, rice oil, millet oil, wheat germ oil and palm oil. Any of these may be included in the feed.

An optional component of the animal feeds is a non-toxic antioxidant. These substances tend to preserve vitamins and the unsaturation in oils by preventing the oxidation which normally occurs during the preparation, storage and use of the animal feeds. In the feed composition the use of from 0.001 to 0.1% by weight of the non-toxic antioxidant has been found to enable the stabilization of the unsaturation and to preserve the nutrient value of the feed during preparation, storage and use of the ruminant feed. Preferred usage involves the addition of from 0.005 to 0.05% of the non-toxic antioxidants.

Complete balanced feeds may contain, if desired, in addition to cellulosic roughage, natural oils and antioxidants, other components for example materials, such as bone meal, salt and the various trace minerals including salts of zinc, copper, manganese, magnesium, cobalt, iodine and iron. Antibiotics, steroids, anthelmintics and other medicants may be used. Various vitamins, particularly A, B, E and D complexes may be added to provide deficiencies in these vitamins incident to the selection of the various components of the complete feed. Stilbestrol is another optional component. Other basic nutrients such as casein, other milk by-products, and synthetic chemicals such as urea, may be used if desired or if they are necessary to satisfy the requirements of the complete feed.

Although the benefits of the invention are described with respect to a specific example, it is not intended that the details thereof should be limitative to the extent that they are encountered in the following claims.

The embodiments of the invention in which an exclusive property or privilege is claimed are defined as follows:

1. A ruminant feed which comprises at least one cellulosic roughage component and a growth stimulating amount of an alkylated phenol of the structure

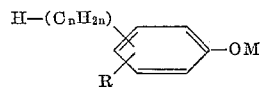

wherein R is an alkyl radical having from 7 to 12 carbon atoms; wherein $n$ is an integer from zero to four; and wherein M is selected from the group consisting of hydrogen and alkali metals.

2. A ruminant feed consisting of a growth stimulating amount of an alkylated phenol of the structure

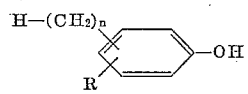

wherein R is an alkyl radical having from 7 to 12 carbon atoms; and wherein $n$ is an integer from zero to four; a cellulosic roughage component; and at least one component selected from the group consisting of natural oils, antioxidants, vitamins, minerals and medicants.

3. A conventional feed for ruminant animals which contains a growth stimulating amount of a phenol of the structure

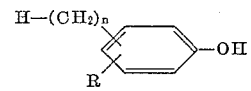

wherein R is an alkyl radical having from 7 to 12 carbon atoms; and wherein $n$ is an integer from zero to four.

4. A ruminant feed comprising from 0.5% by weight to 60% by weight of a cellulosic component containing at least 5% fiber, and 0.1 to 2% by weight of a compound of the structure

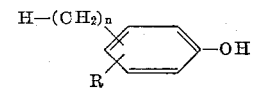

wherein R is an alkyl radical having from 7 to 12 carbon atoms, and wherein n is an integer from zero to four.

5. A ruminant feed which comprises at least one cellulosic roughage component and a growth stimulating amount of nonyl phenol.

6. A ruminant feed which comprises at least one cellulosic roughage component and a growth stimulating amount of octyl phenol.

7. A ruminant feed which comprises at least one cellulosic roughage component and a growth stimulating amount of decyl phenol.

8. A ruminant feed comprising from 0.5% by weight to 60% by weight of a cellulosic component containing at least 5% fiber, and 0.1 to 2% by weight of nonyl phenol.

9. A ruminant feed comprising from 0.5% by weight to 60% by weight of a cellulosic component containing at least 5% fiber, and 0.1 to 2% by weight of octyl phenol.

10. A ruminant feed comprising from 0.5% by weight to 60% by weight of a cellulosic component containing at least 5% fiber, and 0.1 to 2% by weight of decyl phenol.

11. A method of stimulating the growth of ruminant animals which comprises feeding the said ruminants a feed which comprises at least one cellulosic roughage component and a growth stimulating amount of alkylated phenol of the structure

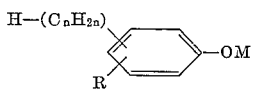

wherein R is an alkyl radical having from 7 to 12 carbon atoms; wherein n is an integer from zero to four; and wherein M is selected from the group consisting of hydrogen and alkali metals, particularly sodium.

12. A method of stimulating the growth of ruminant animals which comprises feeding the said ruminants a feed consisting of a growth stimulating amount of an alkylated phenol of the structure

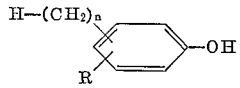

wherein R is an alkyl radical having from 7 to 12 carbon atoms; and wherein n is an integer from zero to four; a cellulosic roughage component; and at least one component selected from the group consisting of natural oils, antioxidants, vitamins, minerals and medicants.

13. A method of stimulating the growth of ruminant animals which comprises feeding the said ruminants a feed comprising from 0.5% by weight to 60% by weight of a cellulosic component containing at least 5 percent fiber, and 0.1 to 2% by weight of a compound of the structure

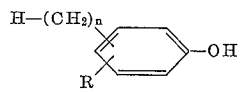

wherein R is an alkyl radical having from 7 to 12 carbon atoms, and wherein n is an integer from zero to four.

14. A method of stimulating the growth of ruminant animals which comprises feeding the said ruminants a feed comprising from 0.5% by weight to 60% by weight of a cellulosic component containing at least 5% fiber, and 0.1 to 2% by weight of nonyl phenol.

15. A method of stimulating the growth of ruminant animals which comprises feeding the said ruminants a feed comprising from 0.5% by weight to 60% by weight of a cellulosic component containing at least 5% fiber, and 0.1 to 2% by weight of octyl phenol.

16. A method of stimulating the growth of ruminant animals which comprises feeding the said ruminants a feed comprising from 0.5% by weight to 60% by weight of a cellulosic component containing at least 5% fiber, and 0.1 to 2% by weight of decyl phenol.

References Cited by the Examiner

UNITED STATES PATENTS 2,721,804   10/1955   Rosenwald _____ 99—8

OTHER REFERENCES

Ely et al.: Distillers Feed Conference, March 12, 1962, page 78, Distillers Feed Research Council, Inc., Cincinatti, Ohio.

Stern et al.: Poultry Science, vol. 32, pp. 26–28, 1953.

A. LOUIS MONACELL, *Primary Examiner.*

RAYMOND N. JONES, *Examiner.*

D. DONOVAN, *Assistant Examiner.*